United States Patent [19]

Sutcliffe et al.

[11] Patent Number: 4,683,018
[45] Date of Patent: Jul. 28, 1987

[54] COMPOSITE MATERIAL MANUFACTURE BY SHAPING INDIVIDUAL SHEETS FOLLOWED BY CONSOLIDATING THE SHEETS

[75] Inventors: David T. Sutcliffe; David J. Barraclough, both of Derby, England

[73] Assignee: Rolls-Royce plc, London, England

[21] Appl. No.: 799,861

[22] Filed: Nov. 20, 1985

[30] Foreign Application Priority Data

Dec. 6, 1984 [GB] United Kingdom ................. 8430891

[51] Int. Cl.⁴ .............................................. B32B 31/20
[52] U.S. Cl. .................................... 156/196; 156/245; 156/289; 156/290; 156/307.4; 156/323; 156/330; 264/257; 264/297.4; 264/297.8; 264/324
[58] Field of Search ............... 156/222, 228, 288, 289, 156/307.4, 307.3, 245, 311, 320, 307.7, 323, 330, 290, 196; 264/257, 297.4, 297.8, 324, 250, 259, 258; 425/340, 411

[56] References Cited

U.S. PATENT DOCUMENTS

| | | | |
|---|---|---|---|
| 2,068,361 | 1/1937 | Ward | 264/297.4 |
| 2,187,294 | 1/1940 | Young | 264/297.4 |
| 2,310,619 | 2/1943 | Dillehay | 264/297.4 |
| 2,721,356 | 10/1955 | MacLeod | 264/297.4 |
| 3,632,730 | 1/1972 | Cotton | 264/297.4 |
| 3,674,589 | 7/1972 | Schaab et al. | 156/288 |
| 3,969,177 | 7/1976 | Doran et al. | 156/330 |
| 4,086,378 | 4/1978 | Kam et al. | 156/245 |
| 4,263,243 | 4/1981 | Wilson et al. | 264/258 |
| 4,412,883 | 11/1983 | Rizo | 156/307.7 |
| 4,461,666 | 7/1984 | Kohn | 156/330 |
| 4,556,529 | 12/1985 | Muser et al. | 264/258 |

FOREIGN PATENT DOCUMENTS 1456472 11/1976 United Kingdom ............... 156/288

*Primary Examiner*—Jerome Massie
*Attorney, Agent, or Firm*—Cushman, Darby & Cushman

[57] ABSTRACT

A composite material comprising reinforcing carbon fibres in an epoxy resin matrix is manufactured by stacking alternate layers of resin impregnated fibre and polyester release film, and compressing the stack between shaped formers at a temperature below the resin cure temperature. The layers are then separated and the release film discarded. After re-stacking, the fibre layers are autoclave moulded on an appropriately shaped former at a temperature at which the layers consolidate and the resin cures.

7 Claims, 3 Drawing Figures

COMPOSITE MATERIAL MANUFACTURE BY SHAPING INDIVIDUAL SHEETS FOLLOWED BY CONSOLIDATING THE SHEETS

This invention relates to the manufacture of composite materials by the consolidation of a plurality of layers of resin impregnated fibres.

A well known method of manufacturing composite materials comprising reinforcing fibres enclosed within a resin matrix is to stack several layers of uncured resin impregnated fibre sheets and then compress the stack in an autoclave at an elevated temperature in order to eliminate voidage by consolidation and curing the resin. While this method is satisfactory in the manufacture of generally planar articles, it does present certain difficulties when the article is manufactured on a sharply contoured former. As the stack is compressed, the lateral movement between adjacent resin impregnated fibre sheets necessary to accomodate the sharp contours is resisted by frictional forces between adjacent sheets. Moreover as the compression of the sheets increases, so do the frictional forces between them.

It is an object of the present invention to provide a method of manufacturing composite materials on a shaped former in which the frictional forces between adjacent resin impregnated sheets are reduced, thereby ensuring improved conformity between the composite material and the former used to define its shape.

According to the present invention, a method of manufacturing a composite material comprises the steps of stacking alternate layers of uncured resin impregnated fibre and thin elastic release film, raising the temperature of said stacked layers to a level at which only partial curing of said resin occurs, and applying sufficient pressure to said stack by opposed correspondingly shaped formers that said stacked layers are formed into the shape defined by said correspondingly shaped formers, allowing said stacked layers to cool and subsequently discontinuing said applied pressure, separating said layers of said stack and removing said thin elastic release films therefrom, restacking said formed partially cured resin impregnated fibre layers on a former corresponding in shape therewith and applying sufficient pressure to said layers to fully consolidate them and at such a temperature and for such a time that the final curing of said resin occurs.

The invention will now be described, by way of example, with reference to the accompanying drawings, in which.

Figure 1:
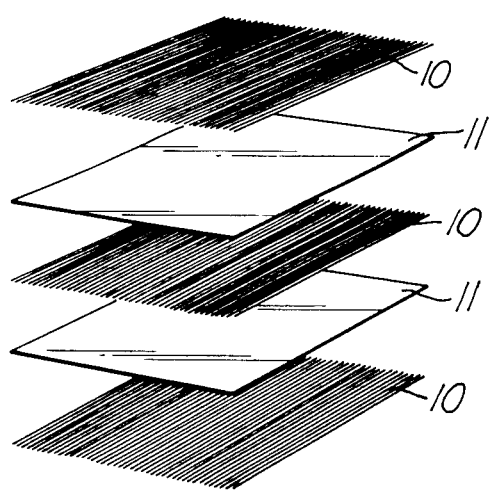
FIG. 1 is an exploded view of a stack of resin impregnated fibre sheets and sheets of thin elastic release film for use in the method of the present invention.
Figure 2:
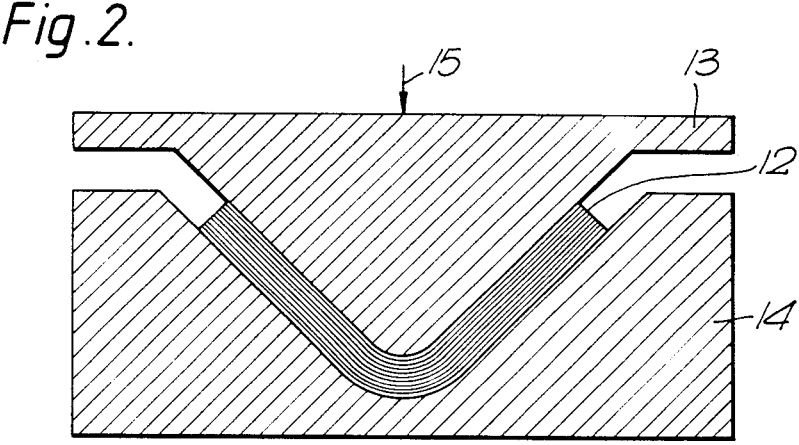
FIG. 2 is a sectioned side view of apparatus for use in the method of the present invention.

With reference to FIG. 1, alternate layers of uncured epoxy resin impregnated carbon fibre 10 and a 0.25 mm thickness polyester elastic release film 11 are stacked in the manner shown so that the layers 10 and 11 are in abutting superposed relationship. The stack 12 constituted by the layers 10 and 11 is then precured at a temperature of approximately 125° C. for a period of about 90 minutes before being placed between two shaped formers 13 and 14 as can be seen in FIG. 2. The formers 13 and 14 correspond in shape so that when pressure is exerted upon the former 13 by, for instance, a hydraulic press in the direction indicated by the arrow 15, the stack 10 is compressed and formed into the shape defined by the formers 13 and 14. Only sufficient pressure is applied to cause the stack to conform to the shape defined by the formers 13 and 14 and the precuring operation is carried out at a time and temperature which are sufficient to ensure that the epoxy resin in the fibre layers 10 is pliable and that there is only partial curing of the resin. It is envisaged that the precuring operation could be carried by providing heating of the formers 13 and 14 if so desired.

During the compression of the stack 12, there is relative lateral movement between the resin impregnated carbon fibre layers 10 as they conform with the shape defined by the formers 13 and 14. This lateral movement is facilitated by the release film 11 interleaved between the resin impregnated carbon fibre layers 10.

When shaping of the stack 12 has been completed, the assembly is allowed to cool under pressure whereupon the formers 13 and 14 are separated and the stack 12 is removed. The stack 12 may be trimmed at this stage if so desired by the method described in our co-pending UK Patent Application No. 8407861. The various layers 10 and 11 of the stack 12 are then separated so as to facilitate the removal of the release film 11 layers from the stack 12. The release film layers 11 are then discarded and the shaped fibre layers 10 restacked.

As the fibre layers 10 are stacked, they are spot welded to each other so as to maintain them in fixed relationship with each other. Other means could be employed in tacking the layers 10 to each other if so desired, for example ultrasonic welding, laser beam welding, welding using short wave length radiation, localised induction heating or possibly a quick setting adhesive which is compatible with the resin used to impregnate the fibre layers 10.

Figure 3:
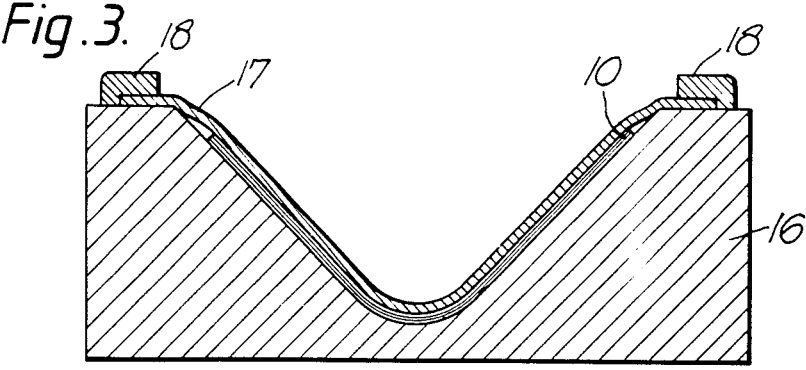
FIG. 3 is a sectioned side view of further apparatus used in the method of the present invention.

The stack of fibre layers 10 is then placed on a former 16 which, as can be seen in FIG. 3, corresponds in shape with the shape of the stack of fibre layers 10 and consequently with the shape of the former 14. In fact the former 14 could be used in place of the former 16 if appropriate. The stack of fibre layers 10 is then overlaid by separators, bleed packs, breather material and a gas impervious membrane 17 which are sealed around their peripheries by a sealing member 18 in the conventional manner. The assembly is then placed in a conventional autoclave and heated at a temperature of 175° C. for two hours at a pressure of 225 Kg/cm$^2$. This serves to provide full consolidation of the stacked fibre layers 10 as well as completion of the curing of the resin contained within the layers 10. Upon cooling and release of pressure, the completed shaped composite material is removed from the former 16.

It will be seen therefore that the method of the present invention provides a method of manufacturing composite materials which, by virtue of its pre-forming step, ensures a perfect fit between adjacent fibre layers 10 and considerably reduces the bulk of the layers 10. It thereby permits the use of autoclave moulding in the manufacture of composite materials which are of complex configuration. A further advantage of the method is that the pre-formed fibre layers 10, since they are substantially rigid and tack-free, are amenable to mechanical handling, thereby opening up the possibility of automation of the stacking procedure prior to autoclave moulding.

Although the method of the present invention has been described with reference to the manufacture of composite materials using autoclave moulding, it will be appreciated that the method is not specifically restricted to the use of autoclave moulding and that other moulding processes, such as vacuum moulding, could be employed under appropriate circumstances.

I claim:

1. A method of manufacturing a composite materials comprising the steps of stacking a plurality of alternate layers of uncured epoxy resin impregnated fibre and thin elastic release film, raising the temperature of said stacked layers to a level insufficient to cure said resin occurs, and applying sufficient pressure to said stack by opposed correspondingly shaped formers so that said stacked layers are deformed from a planar condition and move laterally with respect to one another and are formed into the shape defined by said correspondingly shaped formers, allowing said stacked layers to cool and subsequently discontinuing said applied pressure, separating said layers of said stack and removing said thin elastic release films therefrom, restacking said partially cured resin impregnated fibre layers on a former corresponding in shape therewith and applying sufficient pressure to said layers to fully consolidate them and at such a temperature and for such a time that the final curing of said resin occurs.

2. A method of manufacturing a composite material as claimed in claim 1 wherein the temperature of said stacked layers is raised to a level at which only partial curing of said resin occurs prior to said stacked layers being formed into the shape defined by said correspondingly shaped formers.

3. A method of manufacturing a composite material as claimed in claim 1 wherein the application of said pressure to said layers in order to fully consolidate them and at such a temperature that said resin fully cures is achieved by autoclave moulding.

4. A method of maunfacturing a composite material as claimed in claim 1 wherein said fibre is carbon fibre.

5. A method of manufacturing a composite material as claimed in claim 1 wherein said thin elastic release film is formed from a polyester.

6. A method of manufacturing a composite material as claimed in claim 1 wherein said resin impregnated layers are tacked together after said re-stacking.

7. A method of manufacturing a composite material as claimed in claim 6 wherein said resin impregnated layers are tacked together by welding.

* * * * *